May 20, 1941.   C. A. GREGORY ET AL   2,242,426
PLOW
Filed Jan. 16, 1940   2 Sheets-Sheet 1

INVENTORS
CHARLES A. GREGORY
ARTHUR J. MORELL
QUENTIN J. MEEUWSEN
BY
ATTORNEYS

May 20, 1941.　　C. A. GREGORY ET AL　　2,242,426
PLOW
Filed Jan. 16, 1940　　2 Sheets-Sheet 2

INVENTORS
CHARLES A. GREGORY
ARTHUR J. MORELL
QUENTIN J. MEEUWSEN
BY
ATTORNEYS

Patented May 20, 1941

2,242,426

UNITED STATES PATENT OFFICE 2,242,426

PLOW

Charles A. Gregory, Isabella, Arthur J. Morell, Virginia, and Quentin J. Meeuwsen, Duluth, Minn.; dedicated to the free use of the People in the Territory of the United States Application January 16, 1940, Serial No. 314,098

6 Claims. (Cl. 97—56)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the people in the territory of the United States to take effect on the granting of a patent to us.

This invention relates to plows and more particularly to those types of plows which are used for planting and for fire line trenching.

One of the objects of this invention is the provision of a plow of the type mentioned which is carried by a single wheel and which wheel is equipped with a cutting blade to act as a coulter for the plow point, in addition to providing traction for the plow.

Another object of this invention is the provision of means for adjusting the clearance between the cutting blades of the wheel and the plow point at different plowing depths.

A further object is the provision of means by virtue of which the plow is maintained in a vertical position, irrespective of obstructions in the path of the plow or the degree of turn being negotiated while the plow is drawn forward.

The following description, considered together with the accompanying drawings will disclose this invention more fully, its construction, arrangements and combination of parts and further objects and advantages thereof will be apparent.

Figure 1:
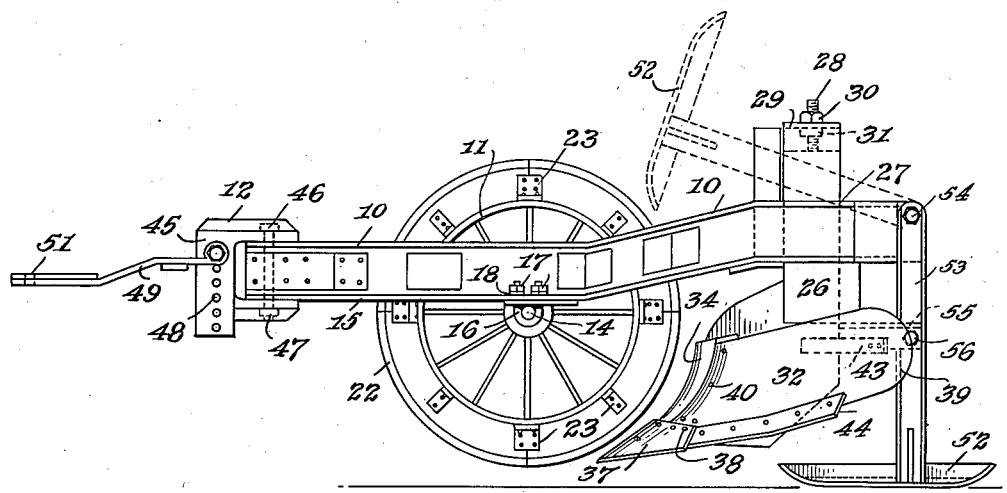
Figure 1 is a side elevational view of an embodiment of this invention.
Figure 2:
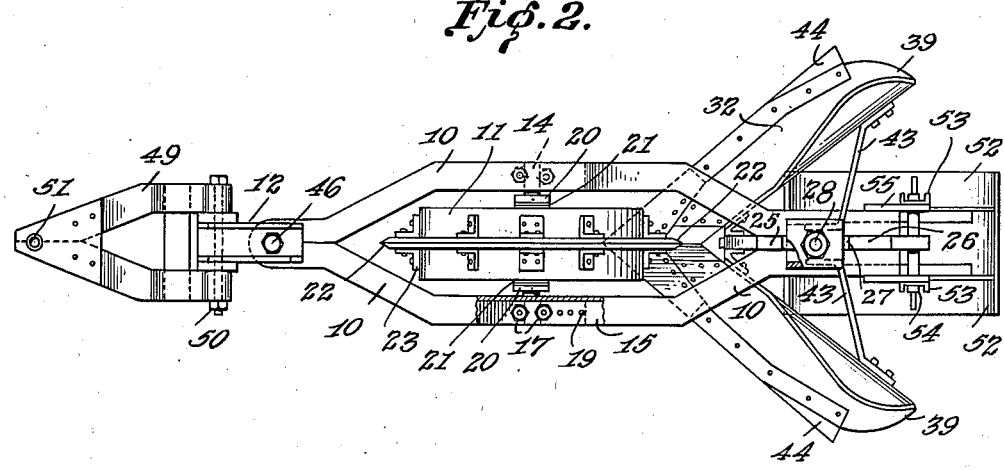
Figure 2 is a plan view of the embodiment illustrated in Figure 1 with a portion of the top flange of one of the channel frame members broken away to show the apertures in the lower plates used in adjusting the position of the wheel 11.
Figure 3:
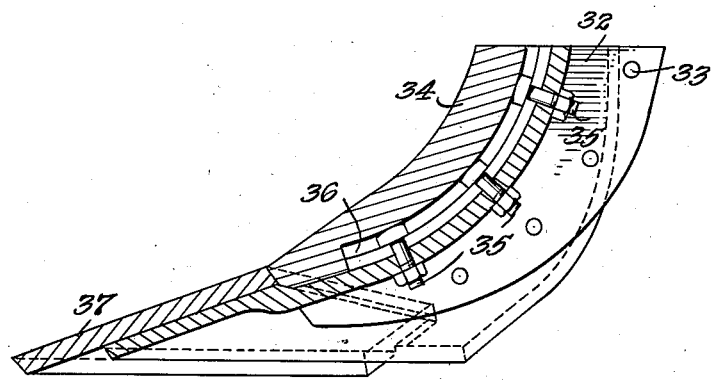
Figure 3 is a vertical section of the plow point.
Figure 4:
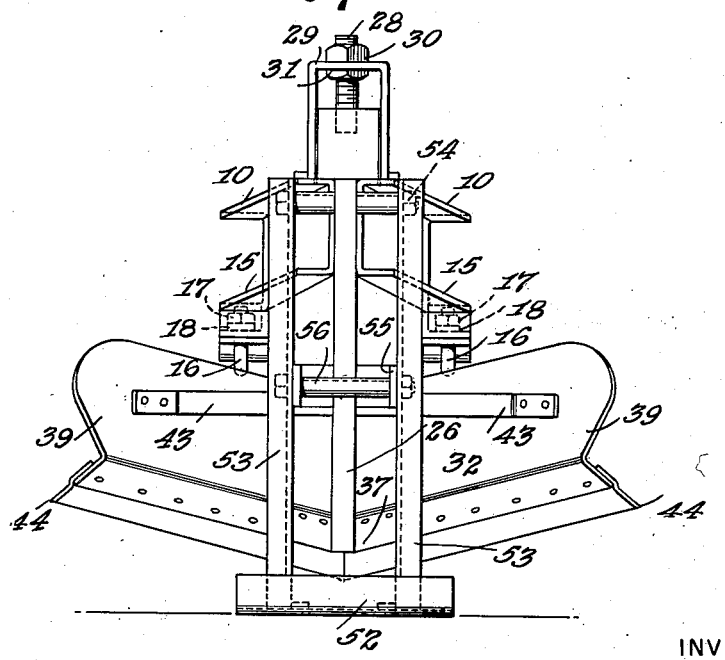
Figure 4 is a rear elevational view.

Referring with more particularity to the drawings in which like numerals designate like parts, the embodiment illustrated comprises longitudinal frame members 10, preferably of outwardly flanged channels. The middle section of the frame members 10 are bowed outwardly providing a space within which the supporting wheel 11 is disposed. The front end of the frame members are secured together and attached to a suitable hitch 12 hereinafter more fully described. The plow assembly is disposed at the rear of the frame members which is also hereinafter more fully described.

As above stated, the wheel 11 is disposed within the opening formed at the middle section between the frame members 10. Said wheel is rotatably mounted on a shaft 14 which shaft is fixed to the lower flanges 15 of the frame members 10 by means of U-bolts 16. The U-bolts 16 project through apertures in the flanges 15 and are held in position by means of nuts 17 and suitable washers 18. In order to provide for a longitudinal adjustment of the wheel 11 with respect to the frame, a plurality of suitably spaced apertures 19 are provided in the flanges 15 with which the U-bolts 16 may register for different positions of the wheel 11. Collars 20 are fixed to the shaft 14, one on either side of the wheel 11 to keep the wheel in position laterally and wear rings 21 are disposed between the collars 20 and wheel 11.

On the periphery of the wheel 11, an angular cutting blade 22 is disposed and secured to the rim by means of angle brackets 23. This blade acts as a coulter for the plow.

At the rear section of the frame members 10 spacing bars 24 and 25 are disposed therebetween providing a slot 27 through which a beam 26, commonly termed the ditcher beam, is disposed for vertical movement.

The upper end of the ditcher beam 26 extending through the slot 27 is fixed to the end of a vertical bolt 28. The upper end of the bolt is threaded and is slidably disposed through a yoke 29, said yoke being fixed to the frame members 10 straddling the slot 27. The bolt 28 is provided with an adjusting nut 30 and a locking nut 31, substantially as shown.

The plow assembly depends from the ditcher beam 26 beneath the frame members 10 and comprises a frog casting 32 attached to the ditcher beam 26 by means of bolt and nut assemblies 33. The plow nose piece 34 is attached to the front face of the frog casting 32 by means of bolt and nut assemblies 35, the heads of the bolts being disposed in a slot 36 in the nose piece 34 and the bolts extend through the front face of the casting 32. The plow point 37 of the plow assembly is attached to the frog casting 32 by means of bolt and nut assemblies 38, substantially as shown. The mouldboards 39 of the plow assembly are attached to the frog casting 32 by means of bolt and nut assemblies 40, there being one mouldboard on each side. These mouldboards are disposed in a forwardly converging position, the rear ends of the mouldboards being braced to the frog casting 32 by means of rods 43. To the outsides of the mouldboards 39 cutting fins 44 are attached, preferably removable. The object of these fins is to cut the soil so as to prevent a roll back into the trench being plowed.

The plow hitch 12 may be of any suitable type, but the type illustrated is preferred and comprises a U-bracket 45, the arms of which are horizontally hinged to the front end of the frame of the plow by means of a pin 46, held by a nut 47 associated therewith. The forward end of the bracket 45 is provided with a plurality of vertically aligned apertures 48 through any one of which the tractor hitch member 49 is vertically hinged by means of a removable bolt and nut assembly 50. The front end of the tractor hitch 49 is provided with an aperture 51, which aperture is adapted to receive the draw bar pin of the tractor.

At the extreme rear of the frame members 10 means are provided for transporting the plow from one locality to another. The means illustrated comprise skids 52 adapted to rest on the ground. These skids are connected to the rear of the frame members 10 by means of legs or stanchions 53, the lower end of the said stanchions being rigidly fixed to the skid and the upper end being pin-connected to the frame members 10 by means of a removably disposed pin 54. When the skids are not in use they may be raised in the position shown by the dotted lines in Figure 1. To lock the skids in operative position, as shown by the full lines in Figure 1, another point of each of the stanchions 53 is fixed to the frame of the machine or parts rigidly associated therewith, such as an extension 55 from the ditcher beam 26, or any other suitable member. The connection may be made by a simple bolt and nut assembly such as that designated by numeral 56 in the drawings. If desired wheels may be used instead of the skids, or any other suitable tractionable means.

Having thus described our invention, we claim:

1. An implement of the character described comprising a suitable frame structure, a wheel for supporting said frame, an annular blade secured to the rim of said wheel for use as a coulter, coupling means on the front of the frame, a plow assembly disposed behind said supporting wheel, means for adjusting said wheel horizontally on the frame structure, and means for adjusting said plow assembly vertically on said frame.

2. An implement of the character described comprising a suitable frame structure, a wheel for supporting said frame, an annular blade secured to the rim of said wheel for use as a coulter, hitching means on the front of the frame, a plow assembly disposed behind said supporting wheel, means for independently adjusting the horizontal and vertical relative positions of said plow assembly and said wheel, a leg support hinged on the rearward portion of said frame, and means for securing said leg in a supporting position.

3. A plowing implement comprising a longitudinal frame, a supporting wheel mounted between the ends of said frame, hitching means secured to the front of said frame, a plow assembly disposed to the rear of said supporting wheel, a leg pivoted at one end to the frame behind said plow assembly, a tractionable footing secured to the other end of said leg, and means for fixing said leg in a vertical operative position.

4. A plowing implement comprising a longitudinal frame, a supporting wheel mounted between the ends of said frame, hitching means secured to the front of said frame, a plow assembly disposed to the rear of said supporting wheel, a leg pivoted at one end to the frame behind said plow assembly, a sled secured to the other end of said leg, and means for fixing said leg in a vertical operative position.

5. A plowing implement comprising a longitudinal frame, a supporting wheel mounted between the ends of said frame, means for adjusting the position of said wheel on said frame, hitching means secured to the front of said frame, a plow assembly disposed on the rear of said frame, said plow assembly comprising a vertical beam, means for adjusting the elevation of said beam with respect to the frame, a plow point and plow nose piece secured to said beam, and forwardly converging mouldboards fixedly associated with said plow point and nose piece.

6. A plowing implement comprising a longitudinal frame, a supporting wheel mounted between the ends of said frame, hitching means secured to the front of said frame, a plow assembly disposed on the rear of said frame, said plow assembly comprising a vertical beam, means for adjusting the elevation of said beam with respect to the frame, a plow point and plow nose piece secured to said beam, forwardly converging mouldboards fixedly associated with said plow point and nose piece, and outwardly extending fins secured to said mouldboards.

CHARLES A. GREGORY.
ARTHUR J. MORELL.
QUENTIN J. MEEUWSEN.